(12) United States Patent
Chidambaran et al.

(10) Patent No.: US 11,434,150 B2
(45) Date of Patent: Sep. 6, 2022

(54) METHOD AND APPARATUS FOR ADVANCED VACUUM MEMBRANE DISTILLATION

(71) Applicant: Aquatech International, LLC, Canonsburg, PA (US)

(72) Inventors: Ravi Chidambaran, Canonsburg, PA (US); Pavan Raina, Pune (IN); Narendra Singh Bisht, Maharastra (IN); Santosh Venkatesh Bhinge, Maharashtra (IN)

(73) Assignee: AQUATECH INTERNATIONAL, LLC, Canonsburg, PA (US)

( * ) Notice: Subject to any disclaimer, the term of this patent is extended or adjusted under 35 U.S.C. 154(b) by 0 days.

(21) Appl. No.: 15/567,894

(22) PCT Filed: Apr. 22, 2016

(86) PCT No.: PCT/US2016/028927
§ 371 (c)(1),
(2) Date: Oct. 19, 2017

(87) PCT Pub. No.: WO2016/172539
PCT Pub. Date: Oct. 27, 2016

(65) Prior Publication Data
US 2018/0118585 A1    May 3, 2018

Related U.S. Application Data

(60) Provisional application No. 62/191,720, filed on Jul. 13, 2015.

(30) Foreign Application Priority Data

Apr. 23, 2015 (IN) .......................... 1129/DEL/2015

(51) Int. Cl.
*C02F 1/44* (2006.01)
*B01D 63/08* (2006.01)
(Continued)

(52) U.S. Cl.
CPC ............ *C02F 1/447* (2013.01); *B01D 61/364* (2013.01); *B01D 61/366* (2013.01); *B01D 61/58* (2013.01);
(Continued)

(58) Field of Classification Search
CPC ...... C02F 1/447; C02F 2103/18; C02F 1/444; C02F 2103/10; C02F 2103/023;
(Continued)

(56) References Cited

U.S. PATENT DOCUMENTS 4,879,041 A * 11/1989 Kurokawa ............... B01D 3/06
210/640
5,028,298 A * 7/1991 Baba ...................... B01D 1/305
159/31
(Continued)

FOREIGN PATENT DOCUMENTS

SU         1745320 A1    7/1992
WO      2006064808 A1    6/2006
(Continued)

OTHER PUBLICATIONS

International Search Report and Written Opinion for PCT/US2016/028927 dated Aug. 25, 2016.
(Continued)

*Primary Examiner* — Krishnan S Menon
(74) *Attorney, Agent, or Firm* — Buchanan Ingersoll & Rooney PC

(57) ABSTRACT

Embodiments provide methods and structures for purification or volume reduction of a brine by an advanced vacuum distillation process (AVMD) to achieve higher flux by pas-
(Continued)

sage of vapors through an AVMD distillation unit. In one example, brine is circulated in a tank. The tank may include one or more membrane pouches that are submerged in the circulating brine or placed above the water level of the hot circulating brine. In other embodiments the membrane pouches are outside of the tank that includes the hot circulating brine but still in communication with it. The circulating brine is heated, allowing creation of water vapor. Using a vacuum, the water vapor is drawn through the membrane, where it may be condensed and subjected to further beneficial use. This process can concentrate to levels to generate crystals or solids, which can be separated and utilized.

12 Claims, 11 Drawing Sheets

(51) Int. Cl.
| | |
|---|---|
| *B01D 61/36* | (2006.01) |
| *B01D 61/58* | (2006.01) |
| *B01D 71/34* | (2006.01) |
| *B01D 71/36* | (2006.01) |
| *B01D 71/52* | (2006.01) |
| *B01D 69/02* | (2006.01) |
| *B01D 61/02* | (2006.01) |
| *C02F 103/18* | (2006.01) |
| *C02F 103/10* | (2006.01) |
| *C02F 103/02* | (2006.01) |
| *B01D 61/14* | (2006.01) |
| *C02F 103/36* | (2006.01) |
| *B01D 9/00* | (2006.01) |
| *B01D 71/02* | (2006.01) |

(52) U.S. Cl.
CPC ............ *B01D 63/08* (2013.01); *B01D 69/02* (2013.01); *B01D 71/34* (2013.01); *B01D 71/36* (2013.01); *B01D 71/52* (2013.01); *B01D 9/0031* (2013.01); *B01D 9/0059* (2013.01); *B01D 61/025* (2013.01); *B01D 61/14* (2013.01); *B01D 71/024* (2013.01); *B01D 2311/08* (2013.01); *B01D 2311/25* (2013.01); *B01D 2311/26* (2013.01); *B01D 2311/2673* (2013.01); *B01D 2313/146* (2013.01); *B01D 2313/36* (2013.01); *B01D 2313/38* (2013.01); *B01D 2325/38* (2013.01); *C02F 1/441* (2013.01); *C02F 1/444* (2013.01); *C02F 2103/023* (2013.01); *C02F 2103/10* (2013.01); *C02F 2103/18* (2013.01); *C02F 2103/365* (2013.01); *C02F 2201/009* (2013.01); *C02F 2209/02* (2013.01); *C02F 2209/10* (2013.01); *Y02A 20/212* (2018.01); *Y02W 10/37* (2015.05)

(58) Field of Classification Search
CPC ............ C02F 2209/02; C02F 2103/365; C02F 2209/10; C02F 1/441; C02F 2201/009; B01D 61/364; B01D 69/02; B01D 61/58; B01D 71/34; B01D 71/36; B01D 71/52; B01D 61/366; B01D 63/08; B01D 2311/26; B01D 61/14; B01D 2311/25; B01D 2313/38; B01D 9/0031; B01D 9/0059; B01D 71/024; B01D 2311/2673; B01D 2313/146; B01D 2313/36; B01D 2325/38; B01D 61/025; B01D 2311/08; Y02W 10/37; Y02A 20/212
See application file for complete search history.

(56) References Cited

U.S. PATENT DOCUMENTS

| | | |
|---|---|---|
| 7,608,188 B2 | 10/2009 | Cath et al. |
| 2006/0086654 A1 | 4/2006 | Voigt et al. |
| 2009/0166171 A1 | 7/2009 | Smith et al. |
| 2012/0067809 A1 | 3/2012 | Nakagawa et al. |

FOREIGN PATENT DOCUMENTS

| | | |
|---|---|---|
| WO | 2007107992 A2 | 9/2007 |
| WO | 2013188450 A1 | 12/2013 |
| WO | 2014058309 A1 | 4/2014 |

OTHER PUBLICATIONS

Australian Office Action in corresponding AU Application 2016250821, dated Sep. 21, 2020.
Canadian Office Action in corresponding CA Application No. 2,983,645, dated Sep. 28, 2020.
Supplementary Search Report and Written Opinion in corresponding European Application No. 16783973, completed on Nov. 23, 2018.

* cited by examiner

FIG. 6A
FIG. 6B
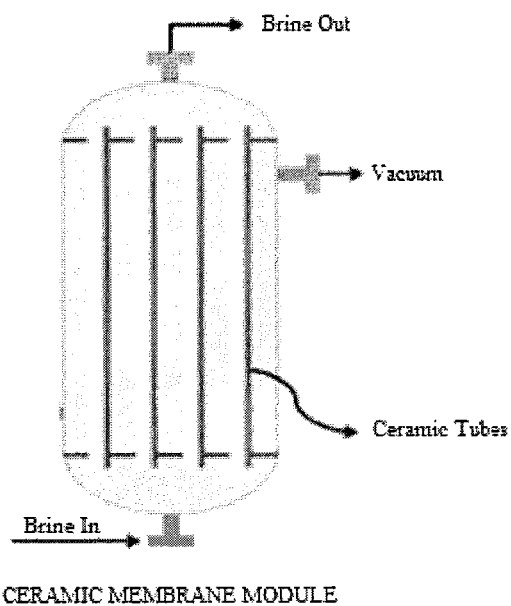
CERAMIC MEMBRANE MODULE
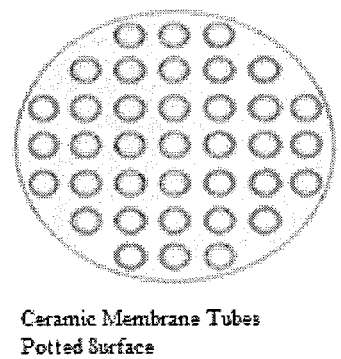
Ceramic Membrane Tubes
Potted Surface

METHOD AND APPARATUS FOR ADVANCED VACUUM MEMBRANE DISTILLATION

CROSS-REFERENCE TO RELATED APPLICATIONS

This application claims the benefit of United States Provisional Patent Application No. 62/191,720 filed on Jul. 13, 2015. This application also claims foreign priority to Indian Application No. 1129/DEL/2015 filed Apr. 23, 2015. Those applications are incorporated by reference herein.

BACKGROUND OF THE INVENTION

Field of the Invention

Embodiments relate to methods and apparatuses for recovery of water from brine using membrane distillation.

Background of the Related Art

Due to scarcity of water and stringent environmental regulations there is a heavy emphasis in recovering water from brine generated by reverse osmosis reject streams, thermal desalination plants and evaporators used in zero liquid discharge plants. Due to enforcement of regulations, concentrate generated by these plants typically cannot be discharged or mixed with a fresh stream of water. Therefore there is a need for treatment of these brines to a zero liquid discharge stage. Once ZLD has been reached, salts can be recovered for beneficial use or sent for disposal, usually by landfill (after environmental clearances have been obtained).

There has been a surge in shale gas production in several countries in the world. This is required to develop other energy alternatives and hedge against rising oil prices. The production of shale gas also results in production of hydraulic fracturing ("frac") water and produced water. Frac water and produced water tend to be very high in total dissolved salts. For example, they may range from 30000 ppm to 250000 ppm. Gas producers seek less expensive ways of managing this environmental challenge. One of the current approaches is to send part of the water for disposal to deep well remote locations. This technique is highly transportation intensive and not sustainable in the long term because there are only limited capacities available for deep wells.

The current methods that exist for treatment are not very comprehensive. They are also very expensive, and stakeholders are looking for a cheaper alternative, which is simple to implement and easy to operate and maintain.

Distillation by membrane is well-known. Membrane distillation has been extensively explored, at least in part because the process can deal with such waters where other membrane systems are limited due to limits of osmotic pressures and scaling, salt concentration and precipitation. Reverse Osmosis (RO) is used for seawater desalination and requires high operating pressure and a good pretreatment process or else the membranes get fouled, effective productivity drops, and efficiency decreases. Modified processes are being worked with RO for higher recovery and for handling water with higher dissolved salts, but the processes require more stringent conditions in pretreatment, and these may be more cost intensive.

Desalination of high salinity water through a conventional distillation process requires expensive equipment with exotic metallurgy, whereas hydrophobic polymeric membranes and plastic components are used for membrane distillation. A hydrophobic membrane has high contact angle and thus has a capability to hold the liquid and allow vapor to cross the membrane surface. The temperature or the vapor pressure gradient is the driving force for vapor to transfer, and this occurs at very low pressure. Purity is very high because the membrane allows only vapor transfer. Therefore liquid saline water, when used as feed, results in a distilled water product. Temperature being the driver, the process becomes particularly interesting in those situations where waste heat is available. Vapor content in water keeps increasing with raise in water temperature and water reaches its boiling point. Membrane distillation processes are used between 50 to 90 deg C. to make them efficient.

Hydrophobic membranes generally used in membrane distillation are of PP (Poly propylene), PEEK(Polyether ether ketone) PTFE (poly-tetra-fluoro ethylene and PVDF (Poly Vinylidene fluoride), etc. These are flat sheet or hollow fiber membranes. The typical membrane distillation apparatus prepared for operation is in a plate and frame configuration. This generates two compartments; one for hot water supply (feed chamber) and the other to collect vapor (cool chamber) and condense it as product.

Membrane distillation is based on hydrophobic membranes. These are microfiltration membranes and have vapor permeability and higher water breakthrough pressure. They do not get wet as they have a high liquid contact angle. There are a variety of methods used in the conventional membrane distillation category. Membrane distillation works based to temperature or vapor pressure gradient as a result of which there is a vapor transfer across the membrane. This is further condensed into pure water. Brine water or salt cannot pass through the membrane barrier due higher water breakthrough pressure.

Membrane distillation has been a technology of interest for several decades, and recently it has gained further importance due to improvements in the membrane properties and increase in flux. This provides possible applications where alternative solutions are either not practical or expensive. For example, the reverse osmosis process is limited by osmotic pressure of the feed water and typically cannot handle high concentration brines when the salt concentrations exceed 60000-70000 ppm. They may also need high levels of pretreatment and SDI levels less than 5 and in some cases less than 3. In thermal desalination and evaporative processes the cost may become prohibitive due to materials of construction and the need for corrosion resistant metallurgy, which may make the process price exorbitant. Membrane distillation is not limited by osmotic pressure and may therefore avoid a number of these disadvantages.

Conventional membrane distillation typically is categorized into the following types based on the process, their operational modes and construction:

1. Direct contact membrane distillation (DCMD): In DCMD mode, hot feed water is circulated in a hot chamber, whereas in a cooling chamber cold water is circulated, and both chambers are separated by hydrophobic membrane. The vapor transferred across the membrane is cooled by the cold water, which is condensed in a cooling chamber. The product keeps adding volume in cool water circulation and is collected.
2. Air gap membrane distillation (AGMD): In this mode, the cooling side has an air gap of few millimeters followed by an additional chamber with a conducting surface cooled by water. The cooled conducting surface cools air to maintain a temperature gradient for vapor transfer. The vapor gets condensed, separated, and collected as distillate.

3. Vacuum membrane distillation (VMD): As in AGMD, there is also an air gap, but there is no conducting surface or cooling water flow. Vacuum is applied in the air gap to extract the vapors transferred, and the vapors are passed through a condenser to condense and collect. This method generates a low flux and during the process concentrated brine remains in the concentrated compartment and progressively gets more concentrated as more distillate is recovered. This method has the draw back, which result in local precipitation of salts on membranes and also this cannot be used for brines near or above the saturation stage.

4. Sweep Gas membrane distillation (SGMD): In this mode, air or a gas like nitrogen is used to carry the vapors and enhance the flux through the membrane The above mentioned conventional membrane distillation processes provide very low flux and also stops working when the water reaches a stage of saturation of salt solubility. Beyond this point crystal deposition starts on the membrane surface, resulting in poor flux and lower salt rejection across the membrane. This also results in irreparable damage to membranes. Also, the conventional membrane distillation process is very expensive in capital costs and involves multiple and complex components to be assembled in a stack design. It has limited capability to pack membrane area and results in lower clean water production, because at a given membrane flux that is low to start with, water production is directly proportional to membrane area. The current designs of membrane distillation are also pressurized and are prone to membrane leakages, which immediately results in loss of product water quality due to huge differential in brine and clean water salt concentration.

Some conventional shortcomings of a membrane distillation have been low flux (typically 2-4 LMH), high energy intensity, high cost of membranes due to low flux, and lower packing density of membranes. Because of these, conventional membrane distillation has found limited utilization commercially in the mass market for desalination.

With a global shortage of good water availability, conversion or recovery of pure water becomes very important both for domestic and industrial use. Following are some applications where membrane distillation can be extensively employed:

a. Increasing the recovery in the conventional desalination processes with a downstream membrane distillation process;
b. Increasing the recovery through waste water recycle plants;
c. Increasing the recovery of water and reducing waste volumes in a zero liquid discharge plant to reduce capital costs in the thermal evaporation system; and
d. Processing a waste stream with high salinity and reusing salts to help discharge issues and also to help preserve the natural resources that are available.

BRIEF SUMMARY OF THE INVENTION

We provide a method and apparatus for advanced vacuum membrane distillation. This provides a much higher flux (4 to 6 times) when compared to conventional membrane distillation processes, enables packaging large membrane surface area, and makes the process and equipment very simple to design, operate and maintain. This concept keeps the concentrated brine solution as a part of bulk solution and includes only a distillate compartment assembly, totally avoiding any concentrate compartment assembly. The brine remains in the bulk solution around the membranes in a recirculation mode to facilitate mixing and avoid build up of local concentration and precipitation.

The increase in concentration in bulk solution is incremental as compared to local increase in concentration that would happen in conventional membrane distillation, which could result in precipitation. There could be multiple embodiments of this invention of AVMD but the following embodiments are discussed in some details here as various options. The space formed by the membrane surfaces, which form the vapor space under vacuum can be kept under the surface of the hot brine (Method a) or kept suspended in the vapor space in the housing where the brine does not come in contact with the membranes (Method b). Alternatively the membranes can be packed in an outside compartment in contact with the hot brine under recirculation and flashing under circulation so that the vapors can be pulled through the membranes and condensed to generate high purity distillate (Method c). In case of Method (a) the membrane surface comes in contact with brine also gets impacted by the corrosive nature of the brine but in both the (b) and (c) Methods membranes do not come in contact with the brine so there is no threat due to corrosive nature of brine or precipitation of salts even under super saturated conditions. In case of (b) and (c) membranes are suspended in vapor space and not in liquid space, brine, as in case of (a). Whereas (a) is ideal for brine concentration before saturation levels as the housing sizes can be kept compact. Method (b) and (c) can be used for brines before saturation and even after saturation. In both (b) and (c) the housing sizes are typically bigger in size than in Method (a). one can also use a sequential flow concept, for example use (Method a) first before saturation, followed by (b) or (c) when the saturation happens and crystals form in the brine. Methods (b) and (c) can also be used either before or after saturation in a single unit or in a sequential units.

In one embodiment of the invention as shown in FIG. 1A, a membrane pouch 12 is made by sealing two hydrophobic membranes 1 and 2 from all sides with one distillate outlet hole 4. Multi membrane pouches 12, are assembled to make one membrane unit as shown in FIG. 2A, which is submerged in a tank 14 as shown in FIG. 3. Hot brine water circulates through a tank 14 with minimal velocity through inlet port 15 and outlet port 16. A vacuum is applied at the distillate outlet port 13, and distillate 31 is recovered from hot feed water 29 by condensing water vapors through an external condenser 25 as shown in FIG. 4A. This unit is called a vacuum membrane distillation (AVMD) unit 24, and the process is called a AVMD process. In some embodiments the AVMD unit may be fully or partially submerged in the circulating brine; these embodiments may be referred to as AVMD units or with the more specific "SVMD unit." In case of method (a).

In AVMD vacuum can be applied in multiple ways. For example, in one embodiment the vacuum is applied by a vacuum pump 28 downstream of a condenser 25 connected to the vapor side of the membrane distillation unit 24 as shown in FIG. 4A. In other embodiments steam or pneumatically driven ejectors 34 are used to apply vacuum as shown in FIG. 4B. The pneumatically driven ejectors 34 can be used where a distillate stream 31 is not required and water vapors 35 can be allowed to escape in the air along with the compressed air. This can be done in Methods (a), (b) and (c). Steam and water driven ejectors can be used for different application of volume reduction by membrane distillation. Alternatively compressors or blowers can be used for generating the vacuum in the (a), (b) or c mode and then, utilizing the heat from the vapors sucked from the MD as source of heat after mechanical compression through the compressor within the system or the steam coming from one stage can be compressed and utilized as a heat source for another stage of membrane distillation to optimize energy consumption.

The AVMD process allows one to concentrate the brine and recover the heat of condensation of vapors, then to use heat energy to evaporate more brine water in subsequent stages. This makes it easy to recover the heat and make it a multistage process for energy efficiency. Further the entire membrane assembly is made of polymeric components, eliminating the need for metallic components and possible corrosion.

In another embodiment of the invention the concentrated hot brine of the AVMD unit is circulated through an inorganic membrane to further concentrate the water to a crystallization stage beyond saturation levels of solubility of salts, where salt crystals can be separated (Method d). Inorganic membranes, for example, ceramic membranes, may be useful in such an embodiment. The water vapors permeate the inorganic membrane and may be condensed on the other side of the membrane by a condenser. One can also apply vacuum on the vapor side and condense the water in an external condenser to generate high purity distillate. This is not possible in the conventional polymeric membrane distillation, where the saturated brine is in contact with membranes, due to deposition of crystals on the membrane surface, which immediately results in loss of flux and rejection properties of membrane due to brine passage.

When ceramic membranes are used, they are typically in a configuration similar to the one shown in FIG. 6A and FIG. 6B, in which a plurality of ceramic tubes are arrayed in an enclosure which allows brine to flow through tubes while a vacuum is applied to remove purified water vapor from the tubes.

The inorganic membranes can be tubular in an "inside out" or an "outside in" mode, or also can be in plate and frame configuration. The tubular membranes in the "outside in" configuration can be used in a forced circulation mode whereas the tubular membrane in an "inside out" mode typically needs to be operated in forced circulation mode.

Due to the nature of the AVMD, which is not plate and frame and where the concentrates brines quickly become a part of the bulk solution, the water recirculation velocity does not need to be high, which is a common feature of the conventional plate and frame membrane distillation process. This process can therefore be used in volume reduction of brines, which may concentrate the brine while recovering high quality distillate for reuse. As one continues to recover the distillate, brine gets concentrated.

In an integrated approach, with polymeric membranes, one can stop the process before the salt saturation happens in method (a) and then send the brine for disposal or any other use. Optionally one may take it for further concentration using method (b) or (c) or inorganic membranes (Method D) and crystallize the salts. While the concentration with polymeric membranes happens in a submerged method (a) membrane distillation process, the optional crystallization happens where the polymeric membrane cartridge or membrane pouches are sitting above the brine liquid surface in the vapor space. The crystallization can also be achieved in a ceramic membrane (Method D). This method maintains adequate velocity to prevent precipitation and residence of crystals in low velocity zones. This is possible in ceramic membranes because of the higher mechanical strength of ceramic material.

The inorganic membranes may be made of hydrophobic material. They may be different substances. For example, they may be alumina, zirconia, or their blends. They can be used in different configurations including flat sheet or tubular in "inside out" or "outside in" configuration.

In the "inside out" mode, salts are retained inside the tubes while the vapors permeate outside the tube. Brine recirculation happens inside the tubes.

In the "outside in" mode the salts are retained outside the tubes while the vapors permeate inside the tube and the brine recirculation happens outside the tube.

The inorganic membrane area can be packed in pressurized modules or submerged modules. Both operate under vacuum to draw the vapors. Such membranes can be conceptually used for membrane distillation process in general at lower or higher concentrations of salts. At higher salt concentrations closer to saturation levels polymeric membrane membranes are less effective as they lose salt rejection properties due to precipitation of salts on the membrane surface. Therefore they may not provide sustained salt rejections. If cost is a consideration, typically it is preferable to use inorganic membranes only where polymeric membranes will not work because of the higher cost of inorganic membranes.

In such a situation typically the bulk of the volume reduction should be preferably done through polymeric membrane and just before saturation the process is shifted to inorganic membrane where salts can precipitate and crystallize. Thus through an optimum integrated process a brine solution can be taken to crystallization stage and a zero liquid discharge process can be achieved. This process can also be operated to get different salts at different stages of brine concentrations for a mixed salts brine.

The submerged membrane, Method (a) distillation process allows concentration of the brine and recovery of pure distillate at minimum energy and maximum flow, while the optional crystallization through a forced circulation process enables further concentration of brine, recovers crystals, and recovers high quality distillate. The polymeric membranes are prone to erosion due to presence of crystals in a submerged mode (a), Inorganic membranes are more rugged and may withstand the erosion process. The same intent can also be achieved by using AVMD in submerged mode method (a) for initial concentration before saturation followed by AVMD in method (b) or method (C) for crystallization. This is an integrated approach of going to a crystallizer.

This process also be integrated with solar energy to further reduce or eliminate the energy component of the operating cost. For example, solar energy may be used to provide heat for evaporation or crystallization.

One embodiment may provide a method for at least one of volume reduction and concentration of brine, including circulating a first brine in a tank, said tank including at least one submerged membrane pouch; creating a negative pressure in said at least one membrane pouch; drawing water vapor from the brine into said at least one membrane pouch, leaving remaining concentrated brine in the tank, wherein the concentrated brine has a higher salt concentration than the first brine; and condensing the water vapor into water for collection, wherein the water for collection includes less impurities than the first brine, and wherein the volume of the concentrated brine is less than the volume of the first brine. In some embodiments the membrane pouch is a polymeric membrane pouch.

Another embodiment may include a method for at least one of volume reduction and concentration of brine by forced membrane circulation, including circulating a first brine through an inorganic membrane unit; creating a negative pressure around the membrane unit; drawing water vapor from the first brine through the membrane unit, leaving a concentrated brine; and condensing the water vapor into water for collection, wherein the water for collection includes less impurities than the first brine, and wherein the concentration of the concentrated brine is greater than the concentration of the first brine. In some embodiments the inorganic membrane unit is a tubular inorganic membrane unit.

In some embodiments after the step of drawing water vapor from the brine into said at least one membrane pouch, further steps include drawing the concentrated brine through an inorganic membrane; creating a negative pressure around said inorganic membrane; drawing a second water vapor from said inorganic membrane, leaving a second concentrated brine outside the inorganic membrane; and condensing the second water vapor into a second water for collection, wherein the second water for collection includes less impurities than the first brine, and wherein the second concentrated brine is more concentrated than the first brine and more concentrated than the concentrated brine.

Methods may include further comprising crystallizing salt from the concentrated brine, wherein the salt can be crystallized to a point that no further concentration of the concentrated brine is possible. This may result in a zero liquid discharge.

Brine may come from many sources. For example, it may be a result of cooling tower blow down. That blow down may be pretreated. Methods as reported herein may also be useful for various systems, including purification of water, waste reduction, and zero liquid discharge processing in a water selected from the group consisting of shale gas fracture water, shale gas produced water, oil and gas extraction produced water, flue gas desulphurization waste water, and cooling tower blow down water.

Methods may also include preparing purified water vapor through AVMD process, including the steps of circulating water for purification through an enclosure, said enclosure including at least one membrane pouch in method (a), (b) or (c); creating a negative pressure in said at least one membrane pouch; drawing water vapor into said at least one membrane pouch, thereby preparing a purified water vapor. In some embodiments the purified water vapor is sent to an atmosphere through one or more of a vacuum ejector, vapor compressor, and vapor pump. In some embodiments the purified water vapor is compressed and used to exchange heat with circulating water for further membrane distillation.

Embodiments may provide a multistage advanced membrane distillation process including circulating water for purification though multiple iterations of processes otherwise disclosed herein, wherein a latent heat of said water vapor is transferred to the brine as heating for a subsequent iteration. As with other processes reported in this disclosure, water that is not turned into vapor may be sent to a crystallizer or for other disposal.

Embodiments may also provide a membrane distillation pouch for recovery of water from brine, including a first hydrophobic membrane and a second hydrophobic membrane, where the first membrane and the second membrane are sealed to each other to form an enclosure having an inside and an outside; wherein the first membrane and the second membrane each have a membrane surface, and wherein each membrane surface is on the outside of the pouch; as well as a polymer netting within the pouch and between the first membrane and the second membrane; and a first hole in the first membrane and a second hole in the second membrane, each of said holes placing the inside of the pouch in communication with the outside of the pouch; and a vapor collector, said vapor collector attached to each of the first hole and the second hole, and said vapor collector including at least one opening permitting the inside of the pouch to remain in communication with the outside of the pouch.

The first membrane and the second membrane may be one of, for example, of PVDF and PTFE. The vapor collector may be made up of polymeric material.

Embodiments may also provide a membrane cartridge, comprising a plurality of pouches where each of said pouches is connected by a header in communication with the vapor collector of each of said pouches. In some embodiments the membrane cartridge includes one or a plurality of spacers between each header.

We also provide an Advanced membrane distillation apparatus, including at least one tank comprising an inlet port and an outlet port; and at least one membrane cartridge in operative communication with the inlet port and the outlet port.

We may also provide a method for collection of distillate from brine or achieving volume reduction of brine including circulating brine though the AVMD apparatus as described herein through the inlet port and out the outlet port, wherein the brine is placed in contact with the outside of each membrane pouch; placing the header in communication with a condenser inlet port; and creating negative pressure in each membrane pouch, thereby drawing water vapor through each membrane pouch, into the header, and into the condenser inlet port; and condensing water from the water vapor.

Various conditions may be useful in some embodiments of the invention. For example, the brine may have a temperature between 60 to 90° C. The water vapor through each membrane pouch may have a flux between 10 to 50 Lm2h. The condensed purified water may have less than 50 ppm dissolved solids. The condensed water has a salt content that is reduced by 99.9 percent and 98% most of the times relative to a salt content of the brine.

We may also provide a method for water purification and membrane distillation by ceramic membranes including placing brine in contact with at least one ceramic membrane; creating a negative pressure around the ceramic membrane; drawing water vapor through the at least one ceramic membrane, leaving concentrated brine; and condensing the water vapor into water for collection. In some embodiments heat for process steps may be provided partially or entirely through use of solar energy.

We may also provide a method for membrane distillation and brine concentration by concentrating hot brine in brine tank and drawing water vapors through at least one membrane cartridge by creating a negative pressure around membrane cartridge, leaving concentrated brine in brine tank; and condensing the water vapor into water for collection. Salt crystals are removed from brine tank through a solid removal device. The flow diagram of the method is shown in FIG. 7A and FIG. 7B. The membrane cartridge can be placed either inside the brine tank (FIG. 7A) or outside of brine tank (FIG. 7B) depending on the size of the system.

BRIEF DESCRIPTION OF THE FIGURES

FIG. 5 also shows a multistage membrane distillation unit where the heat of condensation in first unit heat exchanger used as condenser is used in heating feed brine water for stage 2 membrane distillation.

FIG. 6A shows a side cutaway view of a ceramic membrane module. FIG. 6B shows a top view of an array of ceramic tubes.

DETAILED DESCRIPTION OF THE INVENTION

Figure 2A:
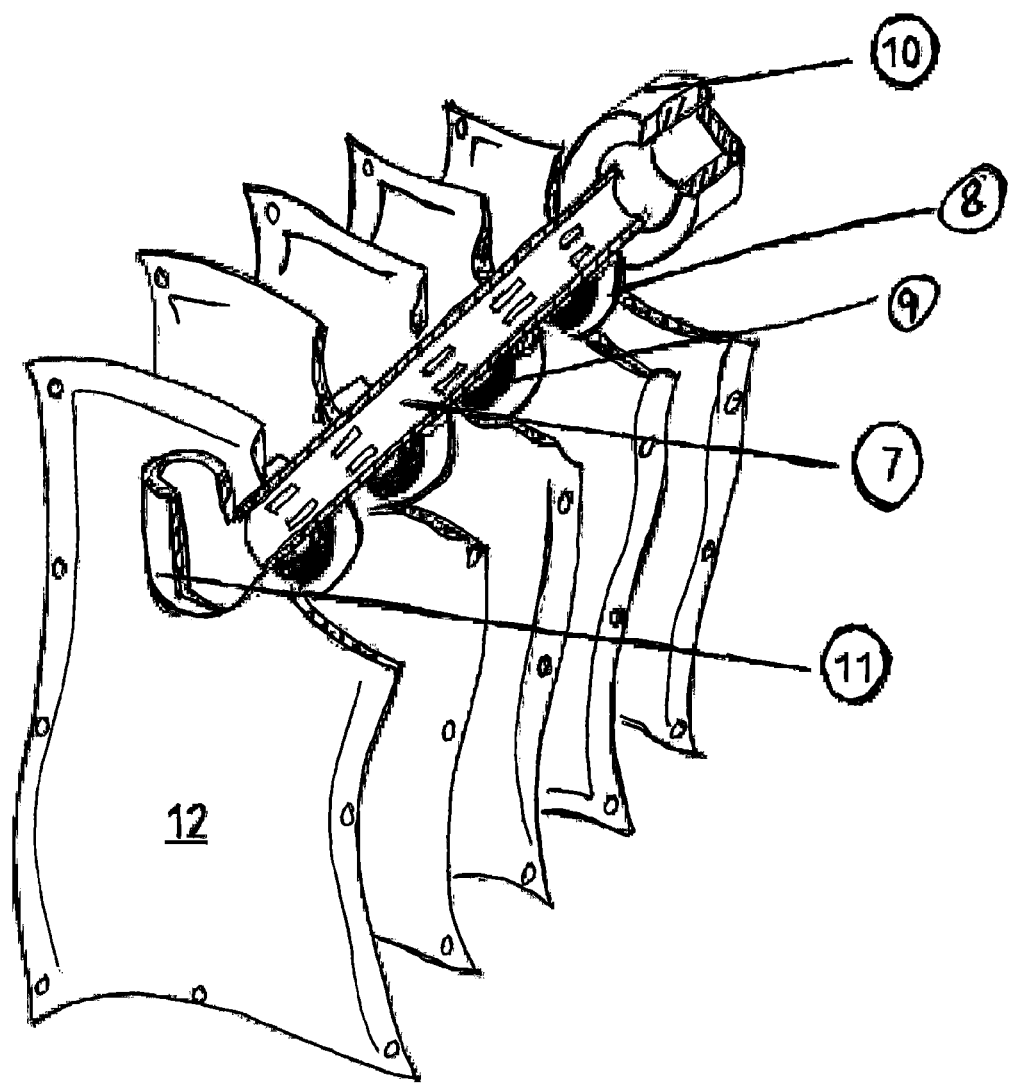
FIG. 2A shows a cut section of assembled multi-membrane pouches 12 explaining the assembly art by developing appropriate components to do that. Header 7 can accommodate number of membrane pouches 12 to be assembled. The vapor spacer 6 of membrane pouch 12 is mated with gasket 9 outside the membrane pouch 12. This is followed by another spacer 8 which is used to maintain a defined gap between two membrane pouches 12. Components 10 and 11 are used for tightening multi-membrane pouches 12 and to make pouches leak proof.
Figure 2B:
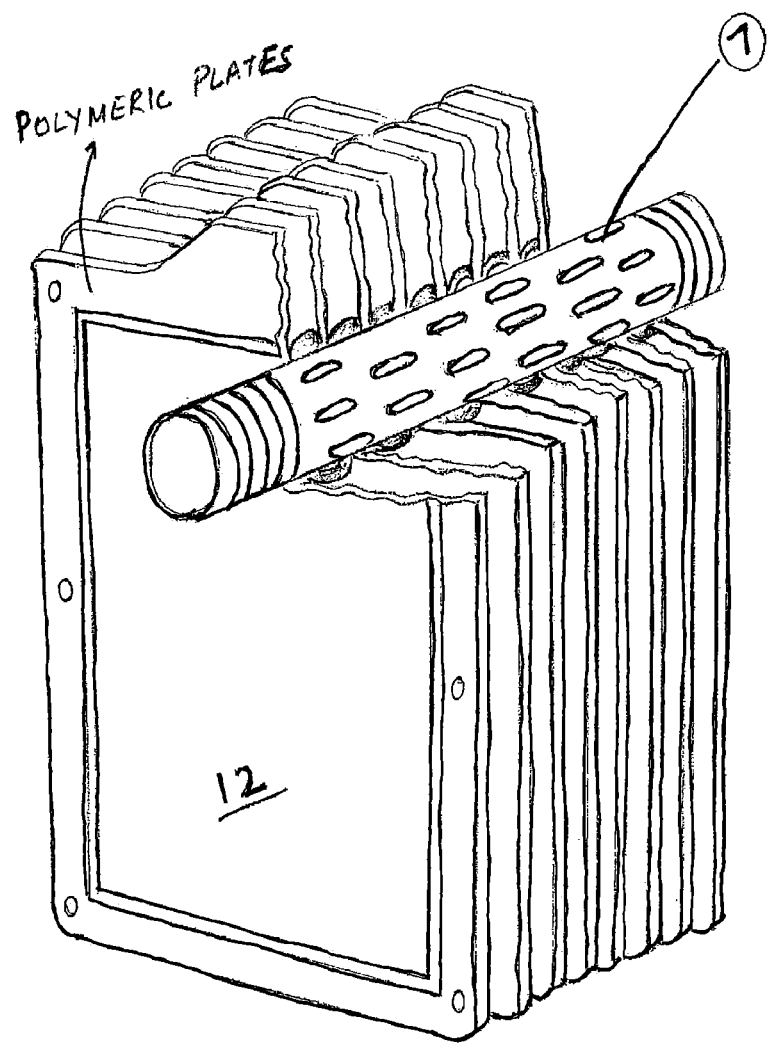
FIG. 2B shows a cut section of assembled multi-membrane pouches with polymeric plate. Process wise membrane assembly can be used in a submerged membrane distillation (Method a) or in suspended membrane distillation (Method b or c)
Figure 3:
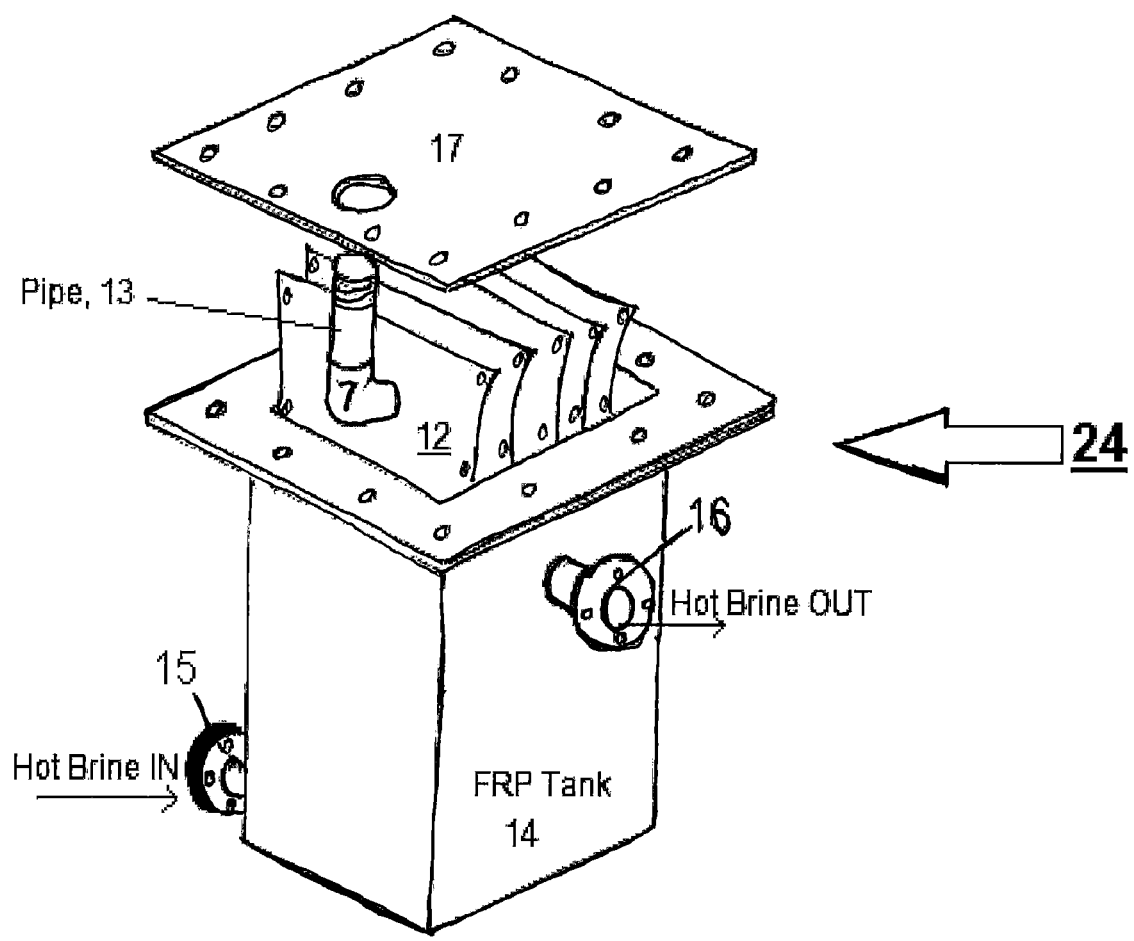
FIG. 3 shows a submerged vacuum membrane distillation unit 24 used in method (a) describing membrane pouches 12 assembly by immersing in a tank 14. The tank 14 essentially has inlet port 15 which allows the feed inflow at the bottom. At the top there is outlet port 16 for hot water to go back to hot water source. Vapor entering the pouch through the hydrophobic membrane pouches 12 and finds outlet through the header 7 and finally through pipe 13 are condensed in an external condenser 25 to produce distillate 32 as shown in FIG. 4.
Figure 4A:
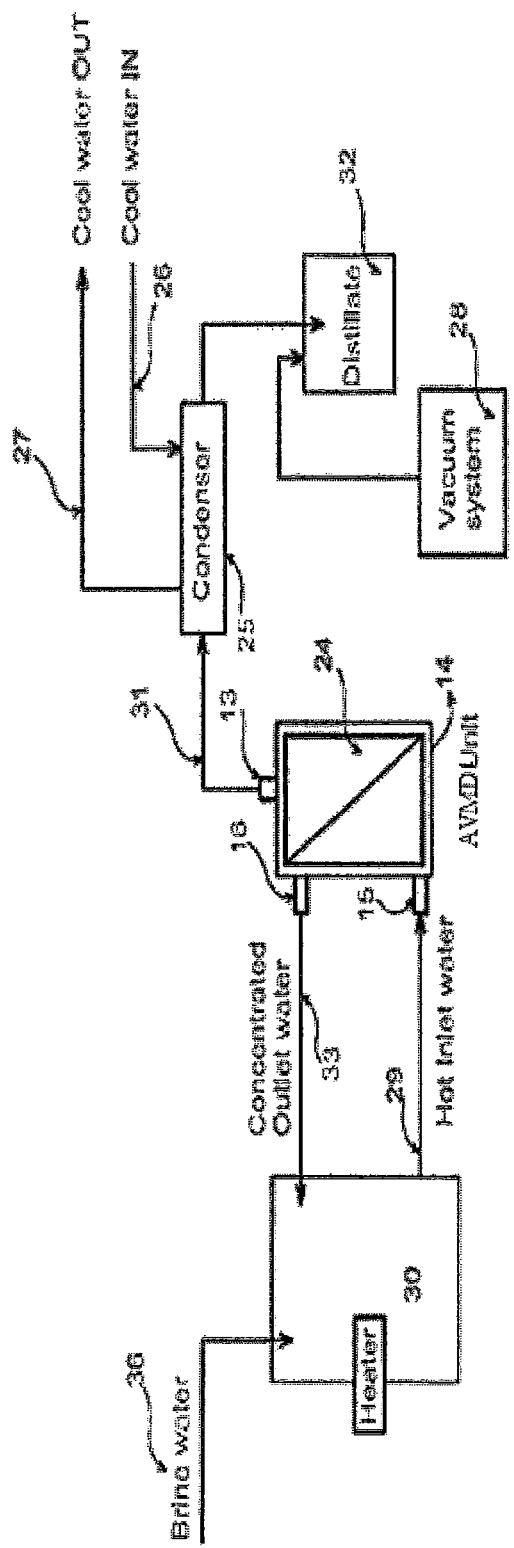
FIG. 4A shows flow diagram of one embodiment of invention by which a AVMD device 24 can be used for purification or concentration of saline hot water 36.

In an embodiment of the invention a device 24 has been made, as shown in FIG. 3 and FIG. 4A, which can be used for desalination and concentration of hot brine water by a process where membrane pouches 12 as shown in FIG. 2A or FIG. 2B are submerged into a tank 14 as shown in FIG. 3 and hot brine water 29 is circulated in the tank 14 with minimum velocity, which can keep the tank water agitated and membrane surface flushed. The vacuum 28 is applied to the submerged membrane distillation unit 24 inside the membrane pouch 12. The water vapors 31 are recovered by applying vacuum 28 through the device 24 and turning the water vapors to condensate and formed distillate 32 in an external condenser 25. The device 24 is prepared by assembly of multi membranes pouch 12 and is submerged in a tank 14 that contains hot brine water 29 and, with the help of a vacuum 28, a distillation process is carried out. For this reason process embodiments may be referred to herein as Advanced Vacuum membrane distillation process" (AVMD Process) and the unit may be called an AVMD unit. Embodiments of the AVMD unit and process may involve one or more of the following steps:

1. Preparation of Membrane Pouch or single membrane unit
2. Assembly of Multi Membrane Pouches to make a AVMD unit or a cartridge
3. Application of AVMD unit for brine concentration by a AVMD process.

Figure 1A:
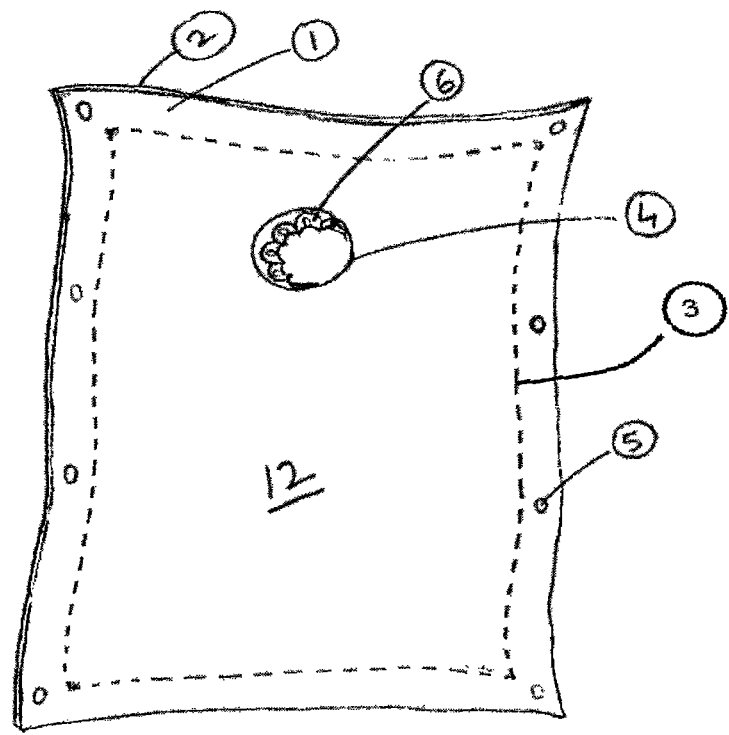
FIG. 1A shows a complete membrane pouch 12 (which may also be referred to as an "envelope") after sealing from all sides.
Figure 1B:
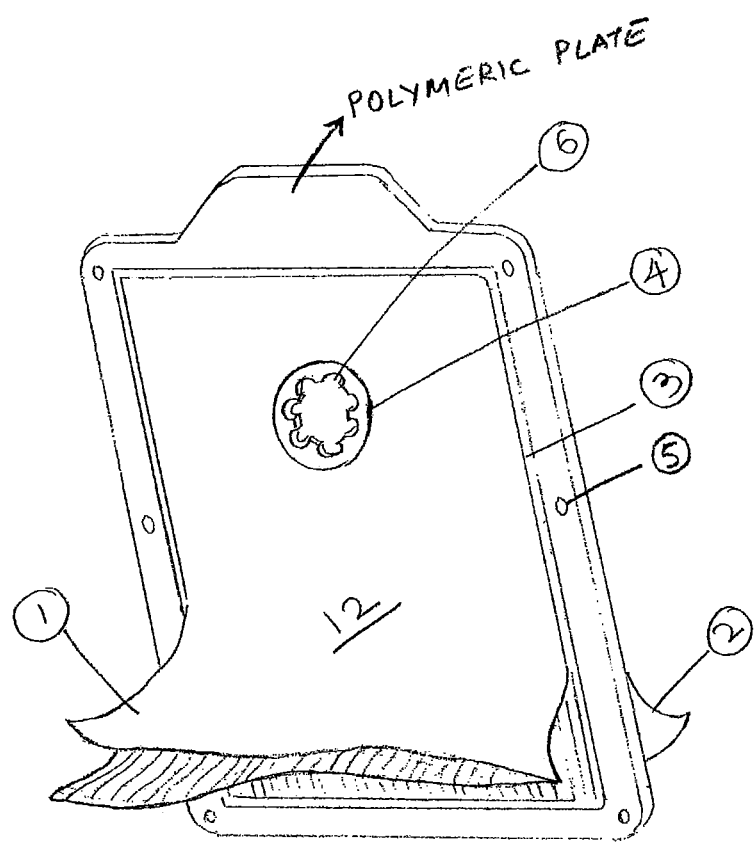
FIG. 1B shows a complete membrane pouch wherein membranes 1 and 2 are sealed on a polymeric plate.

Preparation of Membrane Pouch:

As shown in FIG. 1A, two hydrophobic membranes 1 and 2 are sealed at periphery 3 together first from three sides to form a sealed bag or pouch. The membrane surface is kept on the outer side to face the feed water. Internal membrane surface has the support fabric and between the two surfaces a polymer net is introduced to maintain a minimum gap of 4 to 10 mm, preferably 6 mm, between membranes 1 and 2. At one point of the flat surface a hole 4, is made as an opening in both the membranes. The distillate collection openings are strengthened by using a suitable vapor collector 6, of polymeric material. After this the fourth side of membranes 1 and 2, is also sealed, forming a membrane pouch 12 (FIG. 1A). The sides developed beyond sealing portion 3, holes 5, are drilled which are used to tie up for assembly as multiple pouches in the assembly. The membranes 1 and 2 can also be welded on both sides of a polymeric plate as shown in FIG. 1B, which creates a cavity at the center to apply vacuum. The central plate has a hole 4 for applying vacuum and pulling vapors passing through the membranes.

The vapor collector may be a ring or may have another shape. Typically it encloses the edges of the hole in each membrane and places the opening of the membranes in communication with the environment inside the membrane pouch assembly through one or more holes, slots, or other openings.

Assembling Multi-Membrane pouch:

As shown in FIG. 2A or FIG. 2B, multiple membrane pouch 12, assembled together with the help of header 7. A defined gap is maintained between two membrane pouches by spacer 8, such that even after the expansion of pouch there is minimum free space remaining. After a number of membrane pouches 12 have been assembled, the device is tightened from two ends 10 and 11. One end 10 of the header is closed and the other end 11 is open. The open end is connected with a pipe 13.

The multi membrane pouch assembly with the header can now be immersed in a suitable tank 14 with outlet pipe 13 coming out of the tank as shown in FIG. 3. The tank 14 may be, for example, polypropylene (PP) or fiber-reinforced plastic (FRP). The tank 14 typically has one inlet port 15 and one outlet port 16 for hot brine water circulation. The tank may also include a lid 17 for covering the tank to make it leak proof. The device 24 (AVMD Unit) can now be used for a vacuum membrane distillation process, and is referred to as a AVMD unit 24.

Application of a AVMD Unit for Brine Concentration by a AVMD process:

As explained in FIG. 4A, AVMD Unit 24 can now be used for submerged membrane distillation process for desalination and concentration of brine water 36 by connecting the outer pipe 13 to a condenser 25, which is being cooled by water 26 and 27 on one side. A vacuum pump 28 is connected to the other side of the condenser 25 where the condenser 25 inlet is connected with the header pipe line 13 out of the AVMD unit 24. It can be operated as flow diagram shown in FIG. 4A. Hot brine water 29 of temperature 60 to 90° C., preferably 80° C., which needs to be purified or concentrated, is circulated through AVMD unit 24 through inlet port 15 and passes through the membrane pouches 12 touching their outer surface and finding the outlet port 16 to return into the hot water tank 30. In a condenser 25 cool water 26 and 27 is started and vacuum 28 is applied.

Due to negative pressure inside the membrane pouches 12 and hot water 29 circulating outside the membrane pouch 12, the vapors enter the membrane pouch 12 and are sucked into the condenser 25 through the header 7 and pipe 13 of AVMD unit 24. The vapors 31 are condensed and collected as distillate 32. The reject water 33 of the AVMD unit 24 circulates back into hot water tank 30 where it gains heat and again circulates through the AVMD tank 24.

In this manner the brine water 36 gets concentrated to a desired level, and distillate water 32 is continuously generated. The flux achieved through the AVMD unit 24 is typically very high, usually 20 to 50 Lm2h. This is significantly better in comparison to a plate and frame configuration and makes a AVMD system economical for industrial application. Heat recovery further can be achieved by recovering heat by operation of AVMD unit in stages as explained in FIG. 5. In this concept of AVMD the frame part of the assembly can be avoided which is a standard feature in the plate and frame configuration. To increase the capacity multiple membrane modules can be installed and operated in parallel.

Figure 4B:
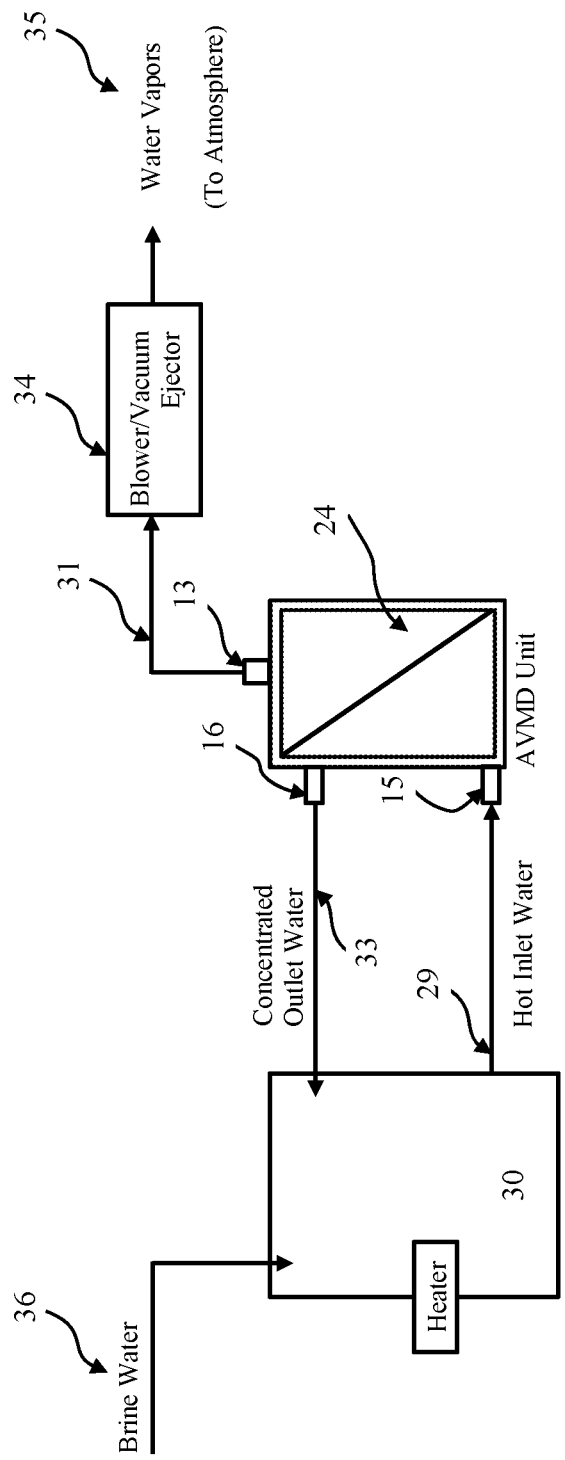
FIG. 4B shows flow diagram of one embodiment of invention by which AVMD device can be used for concentration of saline hot water with the help of blower/vacuum ejector.

AVMD unit 24 can also be operated as flow diagram shown in FIG. 4B where distillate liquid is not required. Hot brine 29 can be concentrated by releasing distillate vapors 35 into the atmosphere with the help of blower/vacuum ejector or other vapor compression or vapor pumping devices 34, if permitted by the local environmental regulations.

Figure 5:
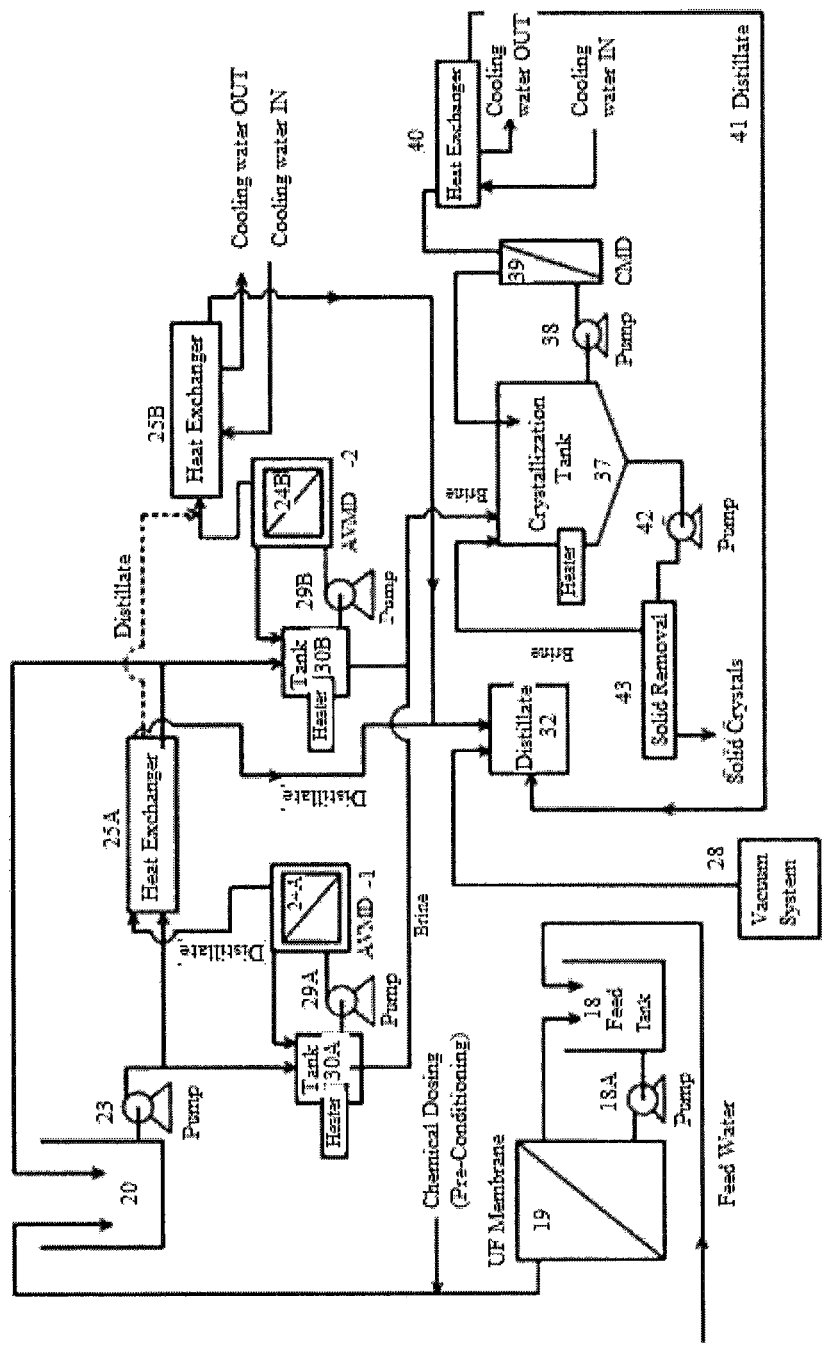
FIG. 5 shows a flow diagram of integrated submerged vacuum membrane distillation and inorganic forced circulation membrane distillation to crystallization of salts as another embodiment of invention.

FIG. 5 shows an embodiment of multistage AVMD and an integrated system where the initial concentration or volume reduction happens through a submerged polymeric membrane distillation to near saturation levels followed by a forced circulation ceramic tubular membrane distillation unit where the further concentration happens and crystals are precipitated and separated. Before the brine is sent to membrane distillation unit it is pretreated through an ultra-filtration system to avoid any particulate matter build up in the polymeric membrane distillation units. This step is required only if the feed water to be treated or concentrated contains particulate matter which can cause erosion of membrane surface.

The feed brine is passed through an ultra-filtration unit 19 through pump 18A and taken into a feed tank 20. The water is then processed through MD units 24A and 24B through their pumps 29A and 29B respectively to achieve a temperature of 60-85° C. and preferably around 80-85° C. thorough tank 30A and 30B heaters respectively. The submerged membrane distillation units operate under vacuum and generate distillate after condensation through heat exchangers 25A and 25B. The heat of condensation or latent heat of vapors in 25A is recovered to heat feed water for feeding membrane distillation in the subsequent stage unit 24B. The vapors generated by the membrane distillation units can also be compressed by a mechanical compressor or thermo compressor and used to drive evaporation in a forced circulation heat exchanger for subsequent membrane distillation units.

The concentrated brine from 24A and 24B through tanks 30A and 30B are sent to crystallization tank 37. The concentrated brine is further heated as required to maintain temperature of 60-90° C., preferably around 80-90° C. and circulated through the tubes of ceramic membrane unit 39, A typical example of configuration of ceramic membrane is shown in FIG. 6A and FIG. 6B. The ceramic membranes will allow only pure vapors to pass through the tubes and will retain brine inside the tubes and return to the tank. The membranes reject more than 99.9% salt and will not lose and salt rejection properties even if some crystals are sitting on the surface of the membrane unlike polymeric membranes, which can not handle crystallization. The shell material of this module can be stainless steel 316 or high alloy stainless steel based on the analysis of brine and its corrosion behavior.

The ceramic membrane operates under the influence of vacuum and distillate is generated by condenser 40 by passing cooling water through this. As the distillate 41 is extracted and collected in tank 32 and brine gets further concentrated beyond saturation levels, crystals start precipitating in tank 37 and inside the tubes of ceramic membrane 39. The crystals are not accumulated in the membrane 39 due to recirculating brine are transferred to tank 37. The crystals are removed from tank 37 through pump 42 through a solid removal device 43 which can be a centrifuge, belt press or any other solids separation and removal device. The crystals can be used as such, further processed by drying or disposed off. The distillate is collected and may be used for beneficial purpose of disposed of. To increase the capacity multiple membrane modules can be installed and operated in parallel.

Figure 7A:
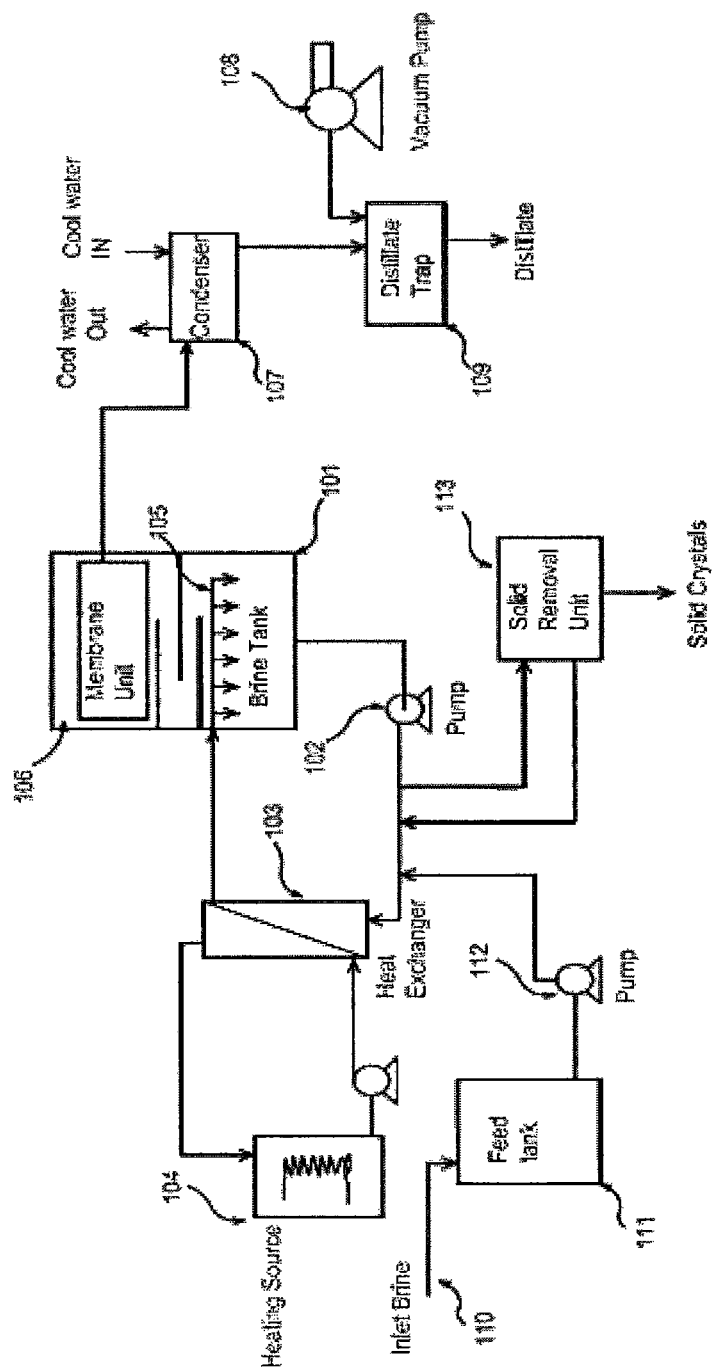
FIG. 7A shows flow diagram of one embodiment of invention by which membrane cartridge device can be used for concentration of saline hot brine up to 30% to 40% salt concentration and up to 50%. In this membrane brine concentration Method (b) process the membrane cartridge is placed inside the brine tank suspended in vapor space and it is an integral part of brine tank.
Figure 7B:
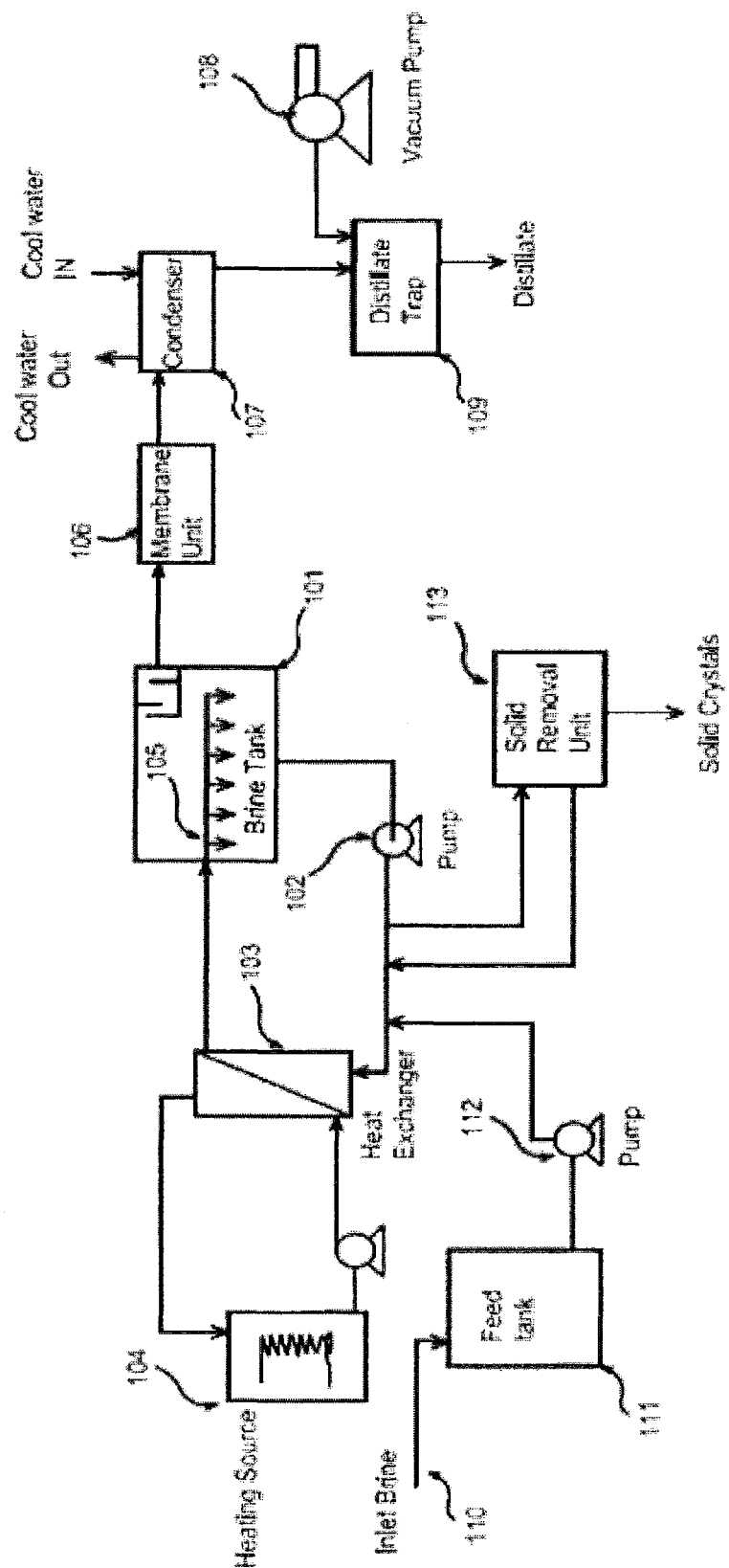
FIG. 7B shows flow diagram of the membrane brine concentration process, Method (c), where membrane cartridge unit is assembled outside of brine tank. In this configuration also concentration of beyond saturation can be achieved beyond crystallization.

In one embodiment of the invention a membrane brine concentration process has been invented as shown in FIG. 7A and FIG. 7B by which high salinity liquid (brine or RO reject water) can be concentrated above saturation level i.e. up to crystallization stage, 30% to 40% of salt concentration. In this invention the membrane cartridge as shown in FIG. 2B and FIG. 3, is assembled within the brine tank as shown in FIG. 7A or assembled outside the brine tank as shown in FIG. 7B, only pure water vapors are comes in contact with membranes. The hot brine liquid circulated in the brine tank through a brine circulation pump and water vapors that generated in the brine tank will be drawn through membrane unit with the help of negative suction pressure of vacuum pump. The hot brine may have a temperature, for example, between 45 and 90° C., preferably between 80 and 85° C., and also preferably below 85° C. By this process consistent distillate flux in the range of 10 $Lm^2h$ to 25 $Lm^2h$, preferably around 15 $Lm^2h$ to 20 $Lm^2h$ is easily achieved with distillate TDS as low as 10 ppm. The main advantages of this process is that the brine or RO reject can be easily concentrated up to 40% (super saturation level) and high purity distillate can be extracted through membrane unit without affecting distillate flux and quality. The salt removal efficiency in distillate is always more than 99.9%. Table-4 data shows the performance of this membrane brine concentration process performs consistently with respect to consistent and steady distillate flux and quality from a brine liquid concentrated from 5% to 40% salt concentration.

In an embodiment of this membrane brine concentration process as shown in FIG. 7A and FIG. 7B, the brine liquid is circulated in brine tank 101 through brine feed pump 102. The brine liquid is heated up to 70° C. to 90° C., preferably 80° C. to 85° C. through heat exchanger 103 during circulation. The hot liquid of heating source 104 is circulated through heat exchanger 103 for transfer of heat to brine liquid. This heat source can be solar, hot water or oil or steam depending on the availability of heat source. The heated brine liquid entered in to brine tank 101 through spray nozzles 105 and water vapors collected towards top of brine tank and passed through membrane unit 106 and then condenser 107 due to negative suction pressure in brine tank and condenser applied through vacuum pump 108. The brine tank further includes baffles between the recirculating brine and the membrane unit. In condenser 107 the water vapors (distillate) condensed into liquid form through condenser 107 secondary cooled water flow and collected in the distillate trap 109. Raw brine or RO reject water 110 is collected in feed tank 111 and through feed pump 112 it is fed in to brine tank 101 to maintain the liquid level in brine tank 101. By this way the brine can be concentrated up to desired salt level and process can be operated in batch wise or continuous mode. The excess salt from brine tank 101 can be separated through a solid removal device 113 which can be a centrifuge, belt press or any other solids separation and removal device and liquid of salt removal device 113 is again fed into the brine tank 101 for further concentration.

Embodiments of the invention will now be further explained by reference to certain examples, which are presented as exemplary embodiments.

Experimental Details:

Experiment-1:

A single membrane pouch 12 was made as shown in FIG. 1A. The membrane active area in the membrane pouch was 0.16 m². The single membrane pouch 12 was assembled in a tank 14 in a similar way as shown in FIG. 3 and tested in a AVMD process as shown in FIG. 4A with brine water of 120000 ppm TDS. Brine water was heated up to 84° C. and circulated through the AVMD unit 24 with a flow rate of 1000 Lph. Vacuum 28 was applied at distillate port 13 and water vapors 31 condensed in a condenser 25 to achieve 17.5 Lm²h to 36.8 Lm²h flux at 490 mmHg to 600 mmHg vacuum respectively. Distillate TDS was found less than 5 ppm in all cases with salt reduction more than 99.99%. Experiment-1 test results are shown in Table-1, below.

TABLE 1

| Flux Lm2h | Feed TDS ppm | Distillate TDS ppm | Salt Redn. % | Feed Flow Lph | Feed Temp. ° C. | Vacuum mmHg |
|---|---|---|---|---|---|---|
| 17.5 | 118329 | 4 | 99.996 | 1093 | 84.1 | 490 |
| 18.8 | 118329 | 4 | 99.997 | 1039 | 83.5 | 500 |
| 19.5 | 120000 | 5 | 99.996 | 1031 | 84.9 | 510 |
| 21.0 | 120000 | 4 | 99.997 | 1042 | 83.8 | 510 |
| 21.9 | 120000 | 4 | 99.997 | 995 | 83.8 | 520 |
| 26.3 | 118329 | 5 | 99.996 | 1060 | 83.5 | 520 |
| 28.8 | 118329 | 3 | 99.997 | 1032 | 83.5 | 540 |
| 32.5 | 118329 | 4 | 99.997 | 1023 | 83.5 | 560 |
| 35.3 | 121080 | 3 | 99.998 | 1072 | 83.4 | 580 |
| 34.0 | 121080 | 2 | 99.998 | 1060 | 84.1 | 580 |
| 36.3 | 121080 | 2 | 99.999 | 1078 | 83.5 | 600 |
| 35.0 | 121080 | 1 | 99.999 | 1063 | 83.6 | 600 |
| 36.8 | 121080 | 1 | 99.999 | 1050 | 83.8 | 600 |

Experiment-2:

In another experiment, five membrane pouches 12 were made as shown in FIG. 1A and assembled as described in FIG. 2A. The assembled membrane pouches 12 were then immersed in a tank as shown in FIG. 3 to operate in AVMD mode. The active membrane area of this AVMD unit was 0.8 m². The prepared AVMD unit was then tested in the AVMD process as described in FIG. 4A for hot brine water containing TDS level from 12000 ppm (1.2% salinity) to 183600 ppm (18.36% salinity). Brine water was heated to 80° C. to 85° C. and circulated through AVMD unit 24 with a flow rate of 100 Lph to 1500 Lph. Vacuum of 500 to 550 mmHg was applied through distillate pipe 13, and water vapor was made to condensate at an external condenser 25 to get pure distillate 32. The AVMD unit 24 was tested for 200 hrs and consistent 15 to 18 Lm²h flux was achieved with salt reduction of 99.99%. Experiment-2 test results are summarized in Table-2, below.

TABLE 2

| | Feed Water | | | | | Distillate | | | Salt |
|---|---|---|---|---|---|---|---|---|---|
| Op. Hrs | Cross flow Lph | TDS mg/L | Temp. ° C. | Temp. Drop ° C. | Vacuum mmHg | Flux Lmh | Flow Lph | TDS mg/L | Redn. % |
| 1 | 1011 | 12180 | 80.6 | 7.9 | 500 | 17.5 | 14 | 17 | 99.862 |
| 5 | 1566 | 12180 | 81 | 5.2 | 480 | 17.5 | 14 | 6 | 99.951 |
| 10 | 1540 | 12000 | 81.6 | 5.1 | 480 | 17.2 | 13.7 | 2 | 99.987 |
| 15 | 1542 | 12300 | 80.4 | 4.8 | 480 | 16.8 | 13.4 | 2 | 99.987 |
| 20 | 1537 | 12300 | 81.5 | 5.3 | 480 | 17.1 | 13.7 | 2 | 99.987 |
| 25 | 1542 | 16800 | 81.2 | 4.9 | 480 | 16.9 | 13.5 | 1 | 99.993 |
| 30 | 1579 | 30300 | 80.1 | 4.6 | 480 | 16.6 | 13.2 | 2 | 99.995 |
| 35 | 1509 | 30600 | 80 | 4.7 | 480 | 15.5 | 12.4 | 2 | 99.995 |
| 40 | 1550 | 30600 | 80.9 | 4.7 | 480 | 15.7 | 12.6 | 2 | 99.995 |
| 45 | 1547 | 31020 | 81.1 | 4.8 | 470 | 14.8 | 11.8 | 2 | 99.994 |
| 50 | 1551 | 31020 | 80.8 | 4.6 | 470 | 15.4 | 12.3 | 2 | 99.995 |
| 55 | 1539 | 31920 | 81.7 | 4.6 | 470 | 15.9 | 12.7 | 2 | 99.995 |
| 60 | 1517 | 32640 | 82.3 | 3.7 | 430 | 12.1 | 9.7 | 2 | 99.994 |
| 65 | 1519 | 33480 | 79.4 | 5.7 | 530 | 19.6 | 15.7 | 12 | 99.964 |
| 70 | 1523 | 33480 | 79.6 | 5.7 | 520 | 19.8 | 15.8 | 1 | 99.996 |
| 75 | 1065 | 34380 | 79.4 | 8.1 | 530 | 17.5 | 14 | 1 | 99.997 |
| 80 | 1054 | 39300 | 80.2 | 8.3 | 520 | 17.2 | 13.7 | 1 | 99.997 |
| 85 | 1058 | 63333 | 79.6 | 7.1 | 520 | 17.1 | 13.7 | 2 | 99.996 |

TABLE 2-continued

| | Feed Water | | | | | Distillate | | | Salt |
|---|---|---|---|---|---|---|---|---|---|
| Op. Hrs | Cross flow Lph | TDS mg/L | Temp. °C. | Temp. Drop °C. | Vacuum mmHg | Flux Lmh | Flow Lph | TDS mg/L | Redn. % |
| 90 | 1023 | 61200 | 79.4 | 7 | 530 | 18 | 14.4 | 2 | 99.996 |
| 95 | 1023 | 61200 | 80.3 | 5.8 | 460 | 12.5 | 10 | 2 | 99.996 |
| 100 | 1035 | 84000 | 79 | 7.6 | 530 | 17.1 | 13.7 | 1 | 99.998 |
| 105 | 1023 | 84000 | 79.7 | 6.4 | 530 | 14.6 | 11.7 | 3 | 99.995 |
| 110 | 1041 | 84000 | 79 | 8 | 530 | 17.5 | 14 | 1 | 99.998 |
| 115 | 1021 | 84000 | 79.3 | 7.8 | 530 | 17.4 | 13.9 | 1 | 99.998 |
| 120 | 1024 | 100000 | 78.8 | 7.8 | 530 | 16.8 | 13.4 | 2 | 99.998 |
| 125 | 1057 | 100000 | 79.6 | 8.1 | 530 | 17.3 | 13.8 | 2 | 99.998 |
| 130 | 1023 | 100000 | 79.1 | 7.7 | 530 | 16.8 | 13.4 | 2 | 99.998 |
| 135 | 1036 | 100000 | 80.3 | 8.7 | 530 | 16.5 | 13.2 | 2 | 99.998 |
| 140 | 1046 | 121740 | 83.8 | 5.6 | 500 | 13.5 | 10.80 | 76 | 99.937 |
| 145 | 1029 | 121740 | 83.1 | 6.4 | 500 | 13.1 | 10.50 | 32 | 99.973 |
| 150 | 1055 | 126000 | 81.5 | 7.6 | 550 | 16.9 | 13.50 | 6 | 99.995 |
| 155 | 1014 | 126000 | 85.4 | 8.3 | 550 | 16.0 | 12.80 | 4 | 99.997 |
| 160 | 1063 | 136680 | 84.3 | 7.3 | 540 | 15.1 | 12.04 | 6 | 99.996 |
| 165 | 1068 | 136680 | 84.8 | 7.3 | 540 | 15.3 | 12.20 | 5 | 99.997 |
| 170 | 1023 | 144120 | 82.8 | 7.2 | 550 | 12.8 | 10.20 | 4 | 99.997 |
| 175 | 1063 | 144120 | 84.3 | 5.3 | 500 | 12.0 | 9.60 | 6 | 99.996 |
| 180 | 1033 | 168000 | 85.3 | 6.0 | 500 | 12.5 | 10.00 | 5 | 99.997 |
| 185 | 1053 | 168000 | 83.2 | 5.6 | 550 | 14.5 | 11.60 | 26 | 99.984 |
| 190 | 1074 | 178200 | 83.3 | 5.7 | 530 | 12.5 | 10.00 | 7 | 99.996 |
| 195 | 1032 | 183600 | 83.4 | 5.7 | 530 | 12.5 | 9.98 | 5 | 99.997 |
| 200 | 1061 | 183600 | 84.2 | 5.8 | 550 | 12.8 | 10.20 | 4 | 99.998 |

Results of Experiment-2:

The hot water feed used was of temperature 82+/−3° C. and vacuum applied was between 400 and 600 mmHg. The operation was with single effect that is with no heat recovery. Flux achieved was between 15 and 18 $Lm^2h$. Purity of distillate was always more than 99.99%. Gain Output ratio (GOR) achieved was between 0.8 and 1.0 confirms the process working efficiently. Ratio of feed cross flow v/s distillate water generated was 30-80:1 time. The concept of multi stage AVMD improves the GOR as we increase the number of stages. The feed water was concentrated up to 180000 mg/L (18% salt) and no impact of salt concentration on distillate purity and flux were observed. Experiment results conclude that AVMD device and process can easily, economically and efficiently concentrate the brine up to 18% of salt concentration.

Experiment-3:

In this experiment a ceramic hydrophobic membrane was used for forced circulation membrane distillation to crystallize the salt. The ceramic membrane module used for the experiment had the following specifications:

Membrane area=0.04 $m^2$
Membrane Type=Tubular
Membrane tube Inner diameter=3.6 mm
Membrane Tube length=760 mm and tube quantity=04 nos.

The ceramic module was tested with cross flow of 309 Lph to 410 Lph (velocity 2.1 m/s to 2.8 m/s) with feed TDS of 12025 ppm. Feed water temperature was maintained between 80° C. and 90° C. The feed water was concentrated up to saturation level, which was 340000 ppm TDS under circulation, and achieved around 5-8 $Lm^2h$ flux at 500 to 700 mmHg vacuum. During the experiment salt reduction was always above 99.8%. The results of experiment are summarized in Table 3, below.

TABLE 3

Forced Circulation Ceramic Membrane Distillation test conditions & Results.
Membrane: Inorganic ceramic membrane
Membrane Area: 0.04 $m^2$

| Feed Water | | | | | Distillate | | | Salt |
|---|---|---|---|---|---|---|---|---|
| Cross flow Lph | TDS mg/L | Temp. °C. | Temp. Drop °C. | Vacuum mmHg | Flux Lmh | Flow mL/hr | TDS mg/L | Reduction % |
| 398 | 12025 | 83.4 | 0.9 | 650 | 4.53 | 180 | 19 | 99.84% |
| 371 | 12025 | 84.3 | 0.9 | 650 | 5.04 | 200 | 14 | 99.88% |
| 376 | 52025 | 85.5 | 1.1 | 650 | 5.54 | 220 | 10 | 99.98% |
| 365 | 52025 | 86.4 | 1.0 | 650 | 5.54 | 220 | 12 | 99.98% |
| 397 | 102025 | 87.1 | 1.0 | 650 | 5.54 | 220 | 15 | 99.99% |
| 390 | 102025 | 88.0 | 1.0 | 650 | 5.29 | 210 | 27 | 99.97% |
| 410 | 150080 | 83.7 | 1.0 | 500 | 2.52 | 100 | 97 | 99.94% |
| 390 | 150080 | 84.6 | 1.0 | 650 | 5.04 | 200 | 75 | 99.95% |
| 370 | 205080 | 85.7 | 0.7 | 650 | 5.54 | 220 | 228 | 99.89% |
| 375 | 205080 | 85.0 | 0.7 | 650 | 5.04 | 200 | 143 | 99.93% |
| 360 | 255080 | 84.7 | 0.7 | 650 | 5.04 | 200 | 255 | 99.90% |
| 333 | 250223 | 88.7 | 0.9 | 700 | 4.03 | 160 | 195 | 99.92% |
| 325 | 310223 | 89.8 | 0.9 | 700 | 5.29 | 210 | 172 | 99.94% |

TABLE 3-continued

Forced Circulation Ceramic Membrane Distillation test conditions & Results.
Membrane: Inorganic ceramic membrane
Membrane Area: 0.04 m²

| Feed Water | | | | | Distillate | | | Salt |
|---|---|---|---|---|---|---|---|---|
| Cross flow Lph | TDS mg/L | Temp. °C. | Temp. Drop °C. | Vacuum mmHg | Flux Lmh | Flow mL/hr | TDS mg/L | Reduction % |
| 309 | 310223 | 90.5 | 0.9 | 700 | 4.28 | 170 | 142 | 99.95% |
| 318 | 340223 | 89.3 | 0.8 | 700 | 4.53 | 180 | 124 | 99.96% |
| 318 | 340223 | 88.1 | 0.6 | 700 | 4.53 | 180 | 118 | 99.97% |

It is evident from the experiment-3 that saline water can be concentrated up to saturation level easily through forced circulation ceramic membrane distillation process.

It is evident from experiment-2 and 3 that the Advanced vacuum membrane distillation process is ideal for generating higher flux and can concentrate water up to 16% to 24% salt level or closer to salt saturation levels depending on constituents of salt and their solubility and forced circulation ceramic membrane is ideal for further concentration of this water up to saturation level to crystallize the salts economically and effectively.

Experiment-4:

In this experiment, membrane brine concentration process was tested as per system shown in FIG. 7A. A brine tank 101 and membrane unit 106 used for the experiment had the following specifications:

Brine tank volume=300 Ltr
Brine liquid volume in tank=150 Ltr
Membrane area=1.12 m2
Heat exchanger area (at heating source and condenser) =2-3 m2 The membrane brine concentration process was tested with brine circulation flow between 1500 Lph and 3500 Lph in brine tank 101 with initial feed brine TDS of 5% (w/w). Inlet Brine liquid temperature was maintained between 75° C. and 85° C. through heating source 104 and heat exchanger 103. The brine liquid was concentrated up to 40% salt level (w/w) under circulation and achieved consistent 15-20 Lm2h membrane flux at 450 to 500 mmHg negative suction pressure through vacuum pump 108. The distillate was condensed through condenser 107 and collected in distillate trap 109. During the experiment the membrane flux remains steady and distillate TDS was below 300 ppm and in many reading it was less than 10 ppm. The salt rejection efficiency is more than 99.9%. The experiments results are summarized in table-4, below

TABLE 4

Membrane Brine concentration process test conditions and results.

| | Inlet Liquid (Brine) | | | | | Distillate | | | Salt |
|---|---|---|---|---|---|---|---|---|---|
| | Circulation | | | | | | | | |
| Op. | flow | TDS | | Temp. | Vacuum | Flux | Flow | TDS | Rejection |
| Hrs | Lph | % | mg/kg | °C. | mmHg | Lm²h | Lph | mg/kg | % |
| Experiment for Brine concentration from 5.2% to 40% salt level. | | | | | | | | | |
| 1 | 3784 | 5.2 | 52000 | 74.8 | 500 | 23.0 | 25.8 | 265 | 99.490 |
| 2 | 3561 | 6.7 | 67141 | 74.8 | 500 | 21.9 | 24.5 | 261 | 99.611 |
| 3 | 3052 | 7.5 | 75000 | 75.3 | 480 | 19.7 | 22.1 | 236 | 99.685 |
| 4 | 2907 | 8.2 | 82092 | 76.1 | 480 | 19.4 | 21.8 | 198 | 99.759 |
| 5 | 3298 | 8.9 | 89077 | 74.4 | 480 | 17.9 | 20.1 | 189 | 99.788 |
| 10 | 2163 | 11.3 | 113463 | 75.5 | 490 | 14.7 | 16.5 | 176 | 99.845 |
| 15 | 1851 | 13.6 | 135517 | 79.5 | 490 | 21.3 | 23.9 | 112 | 99.917 |
| 20 | 2766 | 16.3 | 162858 | 78.4 | 500 | 21.2 | 23.7 | 204 | 99.875 |
| 25 | 2090 | 19.8 | 198118 | 79.5 | 480 | 19.8 | 22.2 | 191 | 99.904 |
| 30 | 1728 | 22.3 | 222668 | 78.9 | 500 | 17.5 | 19.6 | 132 | 99.941 |
| 35 | 1885 | 24.4 | 244432 | 81.0 | 520 | 19.2 | 21.5 | 101 | 99.959 |
| 40 | 2144 | 26.6 | 266339 | 80.1 | 500 | 16.5 | 18.5 | 180 | 99.932 |
| 45 | 1901 | 29.6 | 295505 | 81.3 | 500 | 17.4 | 19.5 | 180 | 99.939 |
| 50 | 2436 | 34.2 | 341991 | 82.8 | 500 | 17.4 | 19.5 | 151 | 99.956 |
| 55 | 2097 | 34.6 | 346496 | 80.1 | 510 | 18.3 | 20.5 | 151 | 99.956 |
| 60 | 2237 | 33.1 | 330982 | 81.1 | 490 | 18.4 | 20.7 | 55 | 99.983 |
| 65 | 2046 | 36.5 | 365000 | 84.1 | 500 | 17.1 | 19.1 | 45 | 99.988 |
| 70 | 2445 | 38.5 | 385000 | 83.3 | 500 | 17.1 | 19.1 | 11 | 99.997 |
| 75 | 2271 | 40.5 | 405000 | 79.6 | 500 | 11.0 | 12.4 | 43 | 99.989 |
| Experiment continued with maintaining 28% to 36% salt level in inlet brine | | | | | | | | | |
| 80 | 2808 | 30.0 | 300000 | 81.3 | 480 | 16.3 | 18.3 | 84 | 99.972 |
| 85 | 1701 | 32.5 | 324540 | 81.9 | 500 | 17.1 | 19.2 | 12 | 99.996 |
| 90 | 2652 | 30.4 | 304300 | 80.7 | 480 | 15.9 | 17.9 | 68 | 99.978 |
| 95 | 1854 | 33.0 | 329655 | 82.1 | 480 | 16.4 | 18.4 | 7.8 | 99.998 |
| 100 | 2223 | 33.7 | 337158 | 81.2 | 490 | 15.1 | 16.9 | 13 | 99.996 |
| 105 | 2213 | 31.7 | 316988 | 81.6 | 490 | 17.8 | 19.9 | 7.8 | 99.998 |

TABLE 4-continued

Membrane Brine concentration process test conditions and results.

| | Inlet Liquid (Brine) | | | | | Distillate | | | Salt |
|---|---|---|---|---|---|---|---|---|---|
| | Circulation | | | | | | | | |
| Op. | flow | TDS | | Temp. | Vacuum | Flux | Flow | TDS | Rejection |
| Hrs | Lph | % | mg/kg | °C. | mmHg | $Lm^2h$ | Lph | mg/kg | % |
| 110 | 2155 | 32.9 | 329248 | 81.7 | 490 | 18.6 | 20.8 | 14 | 99.996 |
| 115 | 2434 | 32.0 | 320000 | 81.8 | 490 | 18.8 | 21.0 | 48 | 99.985 |
| 120 | 2298 | 28.8 | 288303 | 81.5 | 490 | 18.1 | 20.3 | 7.8 | 99.997 |
| 125 | 2374 | 33.2 | 331976 | 80.2 | 490 | 17.1 | 19.2 | 9.0 | 99.997 |
| 130 | 2635 | 29.0 | 290065 | 80.3 | 490 | 18.2 | 20.4 | 4.8 | 99.998 |
| 135 | 2489 | 33.3 | 333234 | 79.5 | 490 | 17.9 | 20.0 | 6.7 | 99.998 |
| 140 | 2430 | 33.3 | 333234 | 77.8 | 490 | 17.9 | 20.1 | 6.6 | 99.998 |
| 145 | 2402 | 28.0 | 280000 | 77.6 | 490 | 17.9 | 20.0 | 4.2 | 99.999 |
| 150 | 2215 | 29.5 | 295000 | 83.0 | 490 | 11.8 | 13.2 | 5.2 | 99.998 |
| 155 | 2250 | 28.8 | 287966 | 80.4 | 500 | 18.3 | 20.5 | 8.4 | 99.997 |
| 160 | 2798 | 29.0 | 290000 | 78.6 | 490 | 17.3 | 19.4 | 10 | 99.997 |
| 165 | 3383 | 29.9 | 299332 | 79.9 | 490 | 17.5 | 19.6 | 4.8 | 99.998 |
| 170 | 2875 | 30.4 | 303984 | 80.6 | 500 | 18.1 | 20.3 | 4.8 | 99.998 |
| 175 | 2062 | 32.3 | 323313 | 79.4 | 480 | 19.1 | 21.4 | 9.0 | 99.997 |

It is evident from experiment-4 that saline water is concentrated above saturation level i.e. 30% to 40% salt level by utilizing AVMD membrane cartridge when operated as shown in FIG. 7A and only water vapors from brine tank passed through membrane and condensed through condenser to formed pure liquid under negative suction pressure. It is also evident that by this process even at above saturation level around 30% to 40% salt level in brine, distillate quality and membrane flux are unchanged. As shown in FIG. 7B, AVMD membrane cartridge may also be placed outside of the brine tank depending upon the size of the plant and can be utilized in similar manner as described in experiment-4.

Based on experiment-2 and 3 results, an integrated process has been devised as shown in FIG. 5, in which feed water is first treated through AVMD unit in a submerged vacuum membrane distillation process and concentrated to a level just below the saturation point based on the salt solubility. The distillate is continuously collected by vacuum system in distillate tank. The feed water temperature maintained around 80° C. with the help of heater fitted in AVMD circulation tank. The concentrated brine of approximately 16-24% salt level is further concentrated up to above saturation levels through forced circulation ceramic membrane distillation system and finally crystallized salt will be formed in the crystallizer tank where it can be used for salt recovery or disposal as per the regulatory requirements.

Embodiments of the invention have been described herein by reference to preferred embodiments. Those of skill in the art will recognize that other embodiments are possible, as they are within the scope and spirit of the appended claims.

We claim:

1. A method for membrane distillation and brine concentration, comprising:
    in an enclosed brine tank, recirculating a hot brine, wherein said hot brine has a water level below a top of the brine tank;
    creating a negative pressure inside at least one membrane cartridge, said membrane cartridge comprising a plurality of membrane envelopes or membrane tubes, that is in communication with the enclosed brine tank and that is above the surface level of the hot brine;
    drawing water vapor from the enclosed brine tank through the plurality of membrane envelopes in the at least one membrane cartridge, thereby creating a first purified water stream and a concentrated brine stream; and
    treating the concentrated brine stream to near saturation or crystallization, wherein when the concentrated brine stream becomes further concentrated a second purified water stream is created,
    wherein the hot brine is maintained at a temperature between 60° C. and 90° C. throughout the entire method.

2. The method of claim 1, wherein the membrane cartridge is within the enclosed brine tank and above the surface level of the hot brine.

3. The method of claim 1, wherein the membrane cartridge is outside the enclosed brine tank.

4. The method of claim 1, wherein said hot brine is maintained at a temperature between 80 to 85° C. throughout the entire method.

5. The method of claim 1, further comprising producing salt crystals in the brine tank and removing the salt crystals from the brine tank.

6. The method of claim 1, further comprising condensing the water vapor into distilled water.

7. The method of claim 1, further comprising compressing the water vapor and exchanging heat from the water vapors with the recirculating hot brine for further membrane distillation and brine concentration to reduce energy consumption.

8. The method of claim 1, wherein the water vapor through the at least one membrane pouch has a flux between 15 to 18 $Lm^2h$ at a pressure between 400 to 600 mmHg.

9. The method of claim 1, further comprising evaporating water from the concentrated brine stream to result in a zero liquid discharge.

10. The method of claim 1, wherein the membrane tubes comprise ceramic membrane tubes.

11. The method of claim 1, wherein the membrane cartridge is inorganic.

12. The method of claim 1, wherein the concentrated brine stream is sent to a crystallizer.

* * * * *